(12) United States Patent
Mössner et al.

(10) Patent No.: US 7,382,077 B2
(45) Date of Patent: Jun. 3, 2008

(54) ELECTRIC MOTOR

(75) Inventors: Jürgen Mössner, Brigachtal (DE); Christian Büchler, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 251 days.

(21) Appl. No.: 11/298,207

(22) Filed: Dec. 8, 2005

(65) Prior Publication Data
US 2006/0125342 A1 Jun. 15, 2006

(30) Foreign Application Priority Data
Dec. 10, 2004 (EP) .................. 04029314

(51) Int. Cl.
  H02K 21/24 (2006.01)
  H02K 1/12 (2006.01)
  H02K 29/00 (2006.01)
(52) U.S. Cl. ............... 310/254; 310/156.32; 310/268
(58) Field of Classification Search ............... 310/254
See application file for complete search history.

(56) References Cited

U.S. PATENT DOCUMENTS

| 4,733,119 | A | * | 3/1988 | Shiraki et al. .............. 310/268 |
| 4,843,268 | A | | 6/1989 | Hovorka |
| 5,801,473 | A | | 9/1998 | Helwig et al. |
| 6,847,147 | B2 | * | 1/2005 | Gladkov .................... 310/179 |

FOREIGN PATENT DOCUMENTS

| EP | 1 365 496 A2 | 5/2003 |
| GB | 2 139 822 A | 4/1984 |
| JP | 10 243590 A | 9/1998 |
| JP | 11 018348 A | 1/1999 |
| JP | 2001 054270 A | 2/2001 |
| JP | 2002 262486 A | 9/2002 |

OTHER PUBLICATIONS

Patent Abstract of Japan vol. 2003, No. 01, Jan. 14, 2003 & JP 2002 262486 A (Mitsubishi Electric Corp.) Sep. 13, 2002 abstract ; figures 1-17.
Patent Abstract of Japan vol. 1999. No. 04 , Apr. 30, 1999 & JP II 018348 A (Matsushita Electric Ind Co. Ltd) Jan. 22, 1999 abstract ; figures 1-8.
Patent Abstract of Japan vol. 1998, No. 14, Dec. 13, 1998 & JP 10 243590 A (Cannon Inc) Sep. 11, 1998 abstract ; figures 1,2.
Patent Abstract of Japan vol. 2000, No. 19, Jun. 5, 2001 & JP 2001 054270 A (Sankyo Seiki MFG Co Ltd) Feb. 23, 2001 abstract ; figures 1-6.
Search Report Dated: Apr. 19, 2005.

* cited by examiner

*Primary Examiner*—Burton Mullins
(74) *Attorney, Agent, or Firm*—Joseph J. Laks; Robert D. Shedd; William A. Lagoni

(57) ABSTRACT

An electric motor comprises a stator (1, 5, 8) having an air-gap which extends around an axis and in which a rotating magnetic field is generated, and a rotor (11, 12, 13) comprising a shaft (11) which is rotatably held by a bearing (10) and a permanent magnet (13) which is held in said air-gap and is driven to rotate around said axis by said rotating magnetic field. The stator (1, 5, 8) is adapted to generate, in addition to said rotating magnetic field, a stationary magnetic field which is rotationally asymmetric with respect to said axis.

7 Claims, 4 Drawing Sheets

ELECTRIC MOTOR

This application claims the benefit under 35 U.S.C. § 365 of European patent application No. 04029314.4 filed Dec. 10, 2004.

FILED OF INVENTION

The present invention relates to an electric motor, in particular but not exclusively to a brushless DC motor.

BACKGROUND

In recent years, demand has grown for miniature electric motors of extremely flat design, which can be used to build flat drives for disk-shaped data carriers such as floppy disks, CD-ROMs, DVDs etc.

The shaft of such a motor has a certain bearing clearance which allows the shaft to sway. Obviously, the sway angle of the shaft is the larger, the smaller the axial dimension of the bearing is (if the shaft is held by a single bearing) or the smaller the distance between bearings at opposite ends of the shaft is. If a disk is rotated by the motor, the axis of rotation of the disk may move in space, and its orientation may vary. This causes a problem when data are read from the disk: Conventionally, the data are arranged on concentric tracks on the surface of the disk, and if the axis of rotation of the disk moves, a servosystem of an actuated reading head of the disk drive may have more problems to follow the track during a turn of the disk, so that data cannot be read consecutively. The distance between the head and the surface of the disk may vary in addition and may sometimes leave the range in which reading is possible.

Part of these variations are periodic, with a period equalling the rotation period of the disk. These variations can be predicted quite accurately based on observation, and they can be compensated by moving the reading head periodically, so that it faces the same track of the disk and does not leave the proper reading distance range during a complete turn. These periodic variations are also referred to as repeatable runout.

However, there is also a non-repeatable runout which is not easily compensated and which may cause serious tracking problems. Reducing this non-repeatable runout by reducing the bearing clearance is a rather expensive solution to the problem, because the components of the motor have to be manufactured with very strict tolerances.

US 2004/0007929 A1 discloses a flat electric motor in which a bearing extends over most of the axial dimension of the motor. There is nothing in this motor that might prevent the shaft from swaying over the entire angle allowed by the bearing clearance.

SUMMARY OF THE INVENTION

The object of the present invention is to provide an electric motor in which a rotor shaft is prevented from swaying over the entire angle allowed by the clearance of a bearing, which holds the shaft.

This object is achieved by an electric motor comprising a stator having an air-gap which extends around an axis and in which a rotating magnetic field is generated, and a rotor comprising a shaft which is rotatably held by a bearing and a permanent magnet which is held in said air-gap and is driven to rotate around said axis by said rotating magnetic field, the electric motor being characterized in that the stator is adapted to generate, in addition to said rotating magnetic field, a stationary magnetic field which is rotationally asymmetric with respect to said axis.

This asymmetric stationary magnetic field will impose an excentric force on the rotor which is in particular perpendicular to the rotational torque on the rotor around its rotor axis and which will therefore cause the rotor to tilt. Such an eccentric force causes a change of the angular momentum vector of the rotor, which is perpendicular to the torque vector. The rotor can fit its axis to this change of angular momentum as far as the bearing clearance allows. The axis of the rotor will therefore assume a constant and well-defined orientation, regardless of how large the bearing clearance is. The non-repeatable runout is reduced considerably.

Preferably, the stator comprises a number of radially oriented spokes made of soft-magnetic material. Using radial spokes instead of a solid disk reduces formation of eddy currents, which would counteract the rotor movement.

According to a first preferred embodiment, as a very simple means to generate the asymmetric stationary magnetic field, at least on of the cross section and the length of the spokes in a first sector of the stator is made different, e.g. in thickness or length, from that of the spokes in a second sector.

Alternatively, the number of spokes per unit angle in the first sector may be made different from that in the second sector. The first and second sectors may extend over about half of the circumference of the stator, respectively.

In order to facilitate the assembly of the motor, the spokes preferably have their inward ends or their outward ends unitarily connected to a ring. Alternatively, they may be embedded in or mounted on a non-conductive material. Preferably, this non-conductive material is a circuit board.

According to a second preferred embodiment, the stator comprises a plurality of coils distributed uniformly around the axis, and in a first sector of the stator, the permeability of a material within the coils is different from that of the coils in a second sector of the stator.

According to a third preferred embodiment, the stator comprises a plurality of coils distributed uniformly around the axis, for generating the magnetic field, and in a first sector of the stator, the number of windings per coil is different from that in a second sector, in order to generate the asymmetric field component.

The motor may be made particularly flat if the coils have their axes oriented parallel to the axis of rotation. The coils may be formed further very economically by printing on a circuit board.

BRIEF DESCRIPTION OF THE DRAWINGS

Further features and advantages of the present invention will become apparent from the subsequent description of embodiments thereof, referring to the appended drawings.

DETAILED DESCRIPTION OF PREFERRED EMBODIMENTS

Figure 1:
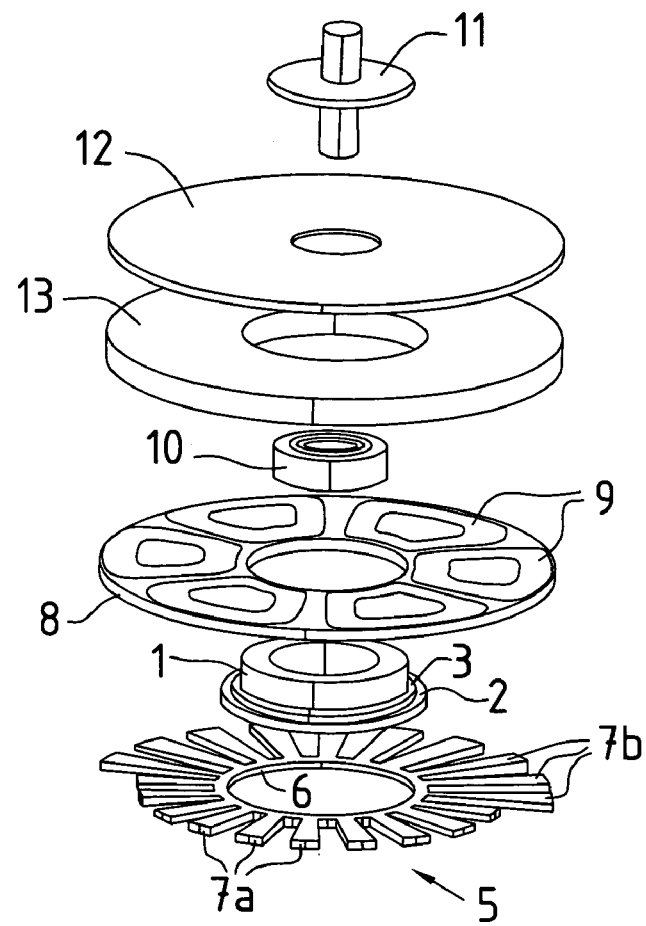
FIG. 1 is an exploded view of a motor according to the first embodiment of the invention.
Figure 2:
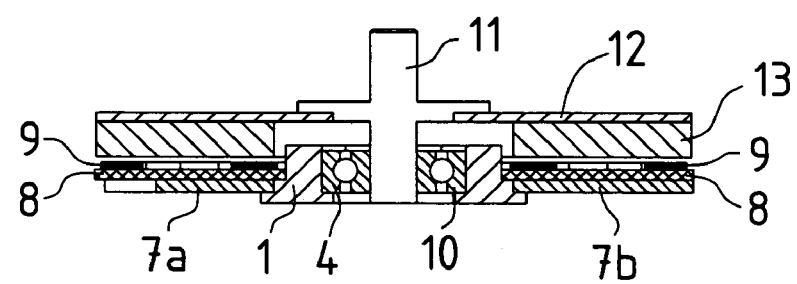
FIG. 2 is an axial cross section of the motor of FIG. 1.
Figure 4:
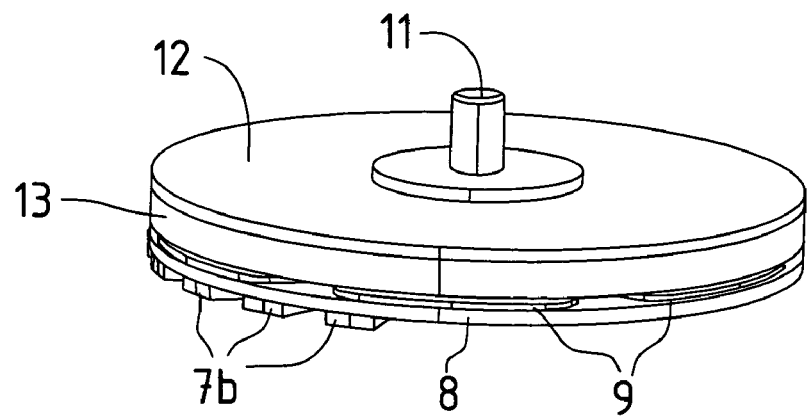
FIG. 4 is a perspective view showing the top side of the motor of FIG. 1.
Figure 3:
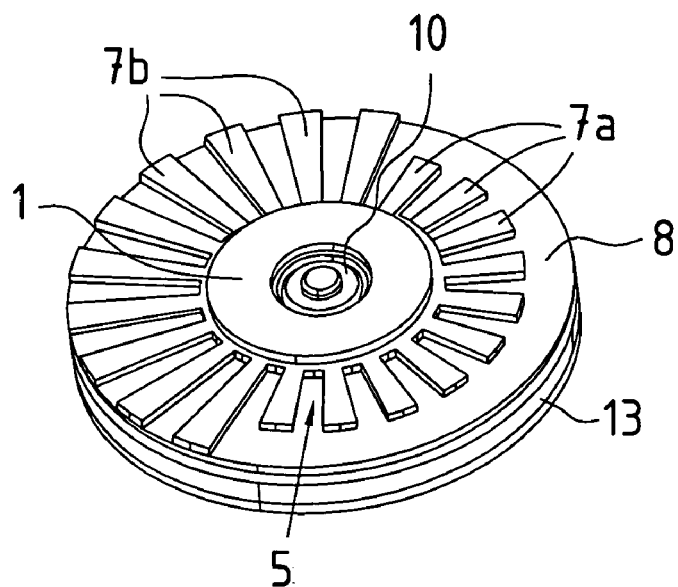
FIG. 3 is a perspective view showing the bottom side of the motor of FIG. 1.
Figure 5:
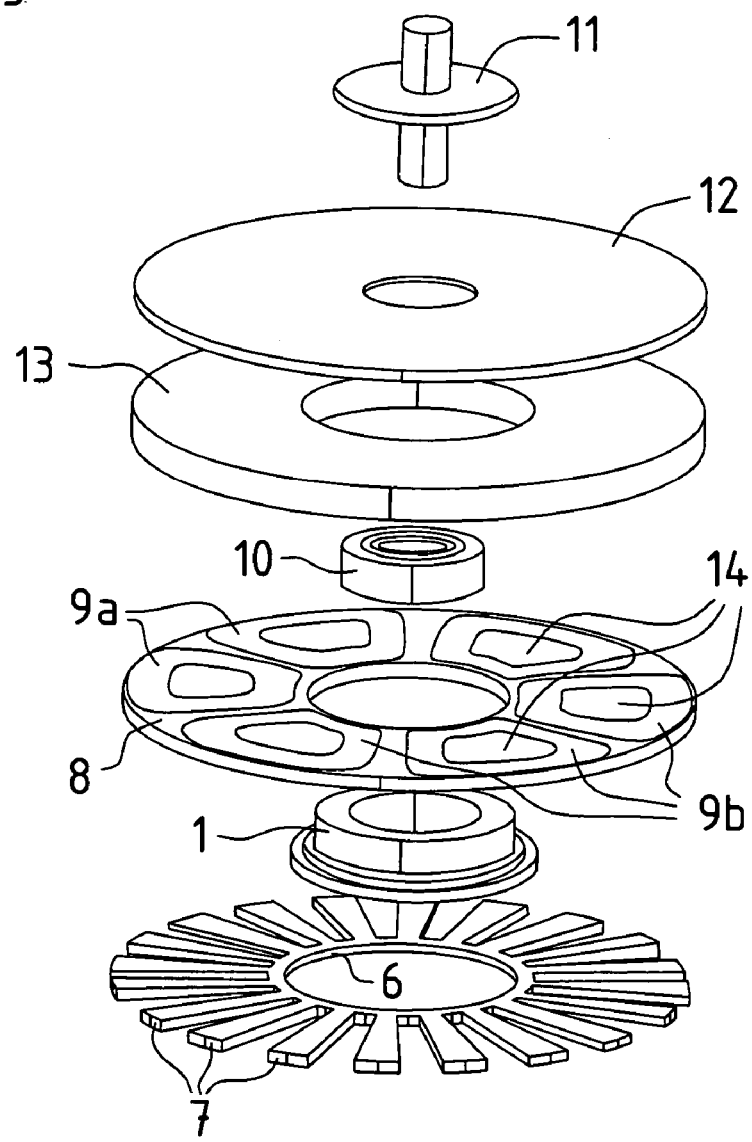
FIG. 5 is an exploded view, analogous to FIG. 1, of a motor according to the second embodiment of the invention.
Figure 6:
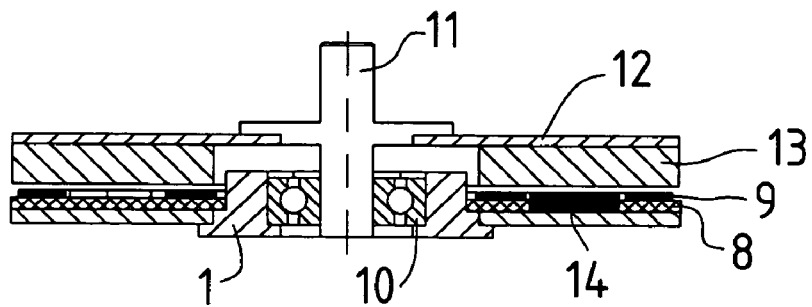
FIG. 6 is an axial cross section of the motor according to the second embodiment.
Figure 7:
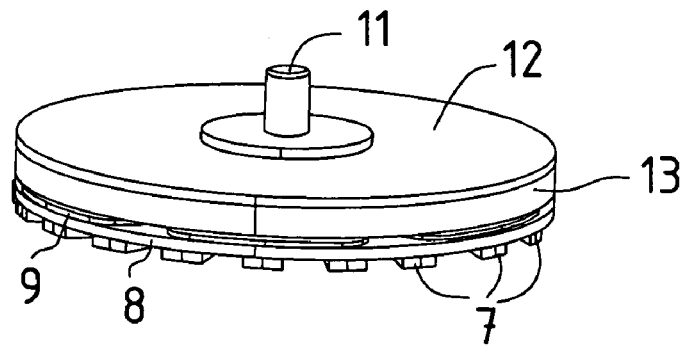
FIG. 7 is a perspective view showing the top side of the motor of FIG. 5.
Figure 8:
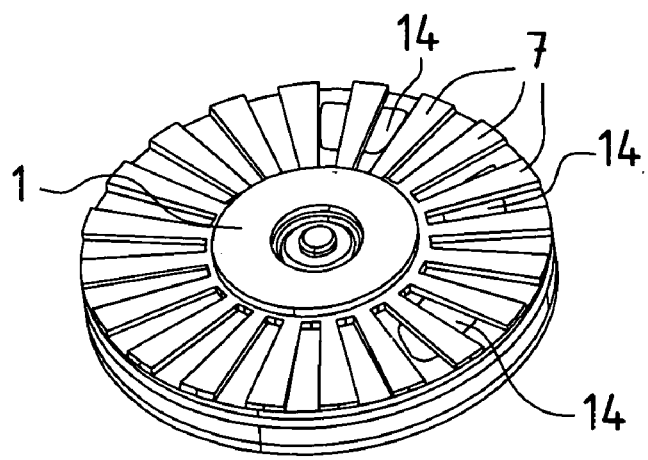
FIG. 8 is a perspective view showing the bottom side of the motor of FIG. 5.

A first embodiment of the motor will be described referring to FIGS. 1 to 4. The motor has a base member 1 made of non-magnetic material, i.e. aluminum, and shaped as a short hollow cylinder with two shoulders 2, 3 extending around the outer periphery of the cylinder and a third shoulder 4 in its inner cavity. The shoulder 2 supports a yoke 5 cut from sheet iron. The yoke 5 is formed of a central ring 6 and a large number of spokes 7a, 7b, which extend radially from the ring 6. In a first half of the yoke 5, facing the viewer in FIG. 1, the spokes 7a are shorter than the spokes 7b of the other half. The long spokes 7b extend up to the outer edge of an annular circuit board 8, which is supported by the shoulder 3 of the base member 1. Six coils 9 are printed on the upper surface of the circuit board 8, opposite the yoke 5. Base member 1, yoke 5 and circuit board 8 form a stator of the motor.

On the inner shoulder 4 of base member 1, an outer ring of a ball bearing 10 is supported. A shaft 11 is fitted snugly into an inner ring of the ball bearing 10. The ball bearing 10 has a clearance.

A radial flange of the shaft 11 carries a rotor disk 12 and a ring magnet 13, which has magnetic poles facing the coils 9. The field axes of the coils 9, being perpendicular to the surface of the circuit board, are parallel to the axis of shaft 11.

As is known in the art, the rotor formed of shaft 11, disk 12 and ring magnet 13 is driven by a rotating magnetic field which is generated by supplying alternating currents of different phases to the coils 9, causing a magnetic flux in a magnetic circuit formed of ring magnet 13, rotor disk 12, shaft 11, ball bearing 10, base member 1 and yoke 5.

Due to the different lengths of spokes 7a and 7b of yoke 5, the air gap width is bigger and the yoke area is smaller in the sector having the shorter spokes 7a than in the sector having the long spokes 7b, and accordingly, the magnetic attraction force experienced by the sector of ring magnet 13 facing the short spokes 7a is less than that of the sector facing the long spokes 7b. Therefore, whenever the motor is in operation, a torque is applied to the rotor, which tends to tilt the rotor around an axis which is perpendicular to the angular momentum vector causing the rotation of the rotor.

It is known that in a freely spinning top, such a torque would cause an axis variation of the angular momentum vector and, hence, of the axis of the top. This is because in a spinning top, the torque vector rotates in synchronism with the direction to which the top is inclined, so that the torque vector is always orthogonal to the angular momentum vector. In the present case, in contrast, the torque vector does not rotate, so that the rotor axis will only tilt in a predetermined direction as far as the clearance of ball bearing 10 will allow. Thus, in spite of the clearance which would allow the shaft 11 to sway, the shaft 11, when driven to rotate by the magnetic fields of the coils 9, will assume a well-defined position and orientation, and a non-repeatable runout is reduced to a minimum.

In the above-described embodiment, the yoke 5 has the inner ring 6 which is supported on shoulder 2 of base member 1 and from which the spokes 7a, 7b extend radially to the outside. The spokes 7a, 7b differ only in length, but not in cross section.

Alternatively, the field asymmetry required for defining the position and orientation of the shaft might be caused by spokes 7a, 7b, which differ not in length but in cross section area.

As another alternative, the angular spacing of the spokes might be made different in first and second sectors of yoke 5.

As a further alternative, the spokes might be connected in one piece by an outer ring, the free ends extending radially to the inside and being supported on shoulder 2 of base member 1. In this case an electrically isolating layer should be provided between the free ends of the spokes and the base member in order to prevent the flow of eddy currents from the outer ring through a first spoke and the base member and back to the outer ring through a second spoke. Another alternative is, that the spokes 7a and 7b, connected in one piece by an outer ring, don't extend to the base member 1 but are only supported by a connection to the circuit board 8, for example by glueing.

A second embodiment of the motor is described referring to FIGS. 5 to 8. Components of this motor that have identical counterparts in the motor of the first embodiment have the same reference numerals as these and are not described again.

In the motor of this second embodiment, the yoke 5 has spokes 7 of identical shape which extend radially to the outside from an inner ring at regular angular intervals. An asymmetric magnetic field component is generated in this embodiment by the fact that among the coils 9 on the circuit board 8, there is one group formed of three consecutive coils 9b, which have a metal core 14, whereas the remaining three coils 9a that form the other group do not. These metal cores 14 may simply be fixed to the surface of circuit board 8, e.g. by glueing; preferably as shown in the cross section of FIG. 6 and the bottom view of FIG. 8, they are fitted into holes that are formed in the circuit board 8. The metal cores 14 are also effective to decrease the air gap width in the half of the circuit board 8 occupied by the coils 9b, so that in this half, the ring magnet 13 is subject to a stronger magnetic attraction force than in the half bearing the empty coils 9a. Just like in the first embodiment, the asymmetry of the magnetic field causes the shaft 11 to assume a well-defined, slightly tilted orientation.

Figure 9:
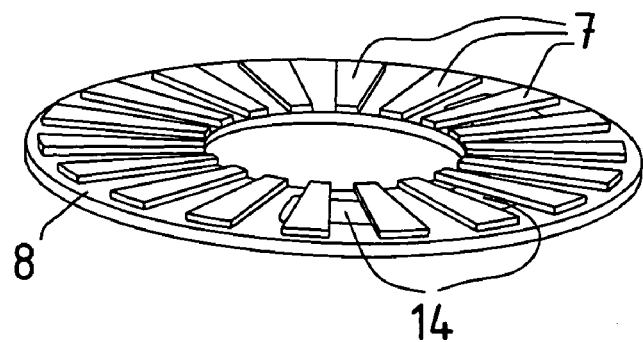
FIG. 9 is a bottom view of a circuit board according to a third embodiment of the motor.
Figure 11:
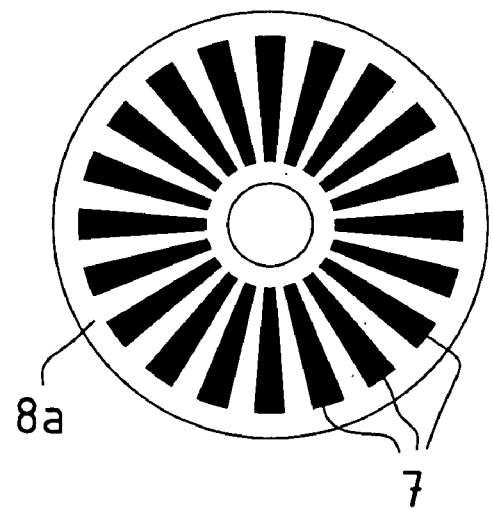
FIG. 11 is a plane view of a circuit board according to a third embodiment of the motor.

FIG. 9 is a bottom view of a circuit board according to a third embodiment of the invention. In this embodiment, instead of a one-part yoke, there is only a number of radial spokes 7 which are not directly interconnected but fixed, e.g. by glueing, to the bottom side of the circuit board 8. Similar to the embodiment of FIGS. 5 to 8, the part of the coils formed on the top side of circuit board 8, not shown, have metal cores 14 which extend through holes of the circuit board 8. For mounting the spokes 7 on the circuit board 8, conventional technology for assembling electronic circuits from discrete components may be employed. Another alternative could be a single plastic yoke part 8a, with integrated spokes 7, the plastic yoke part made by e.g. an injection moulding process, in accordance with FIG. 11.

Figure 10:
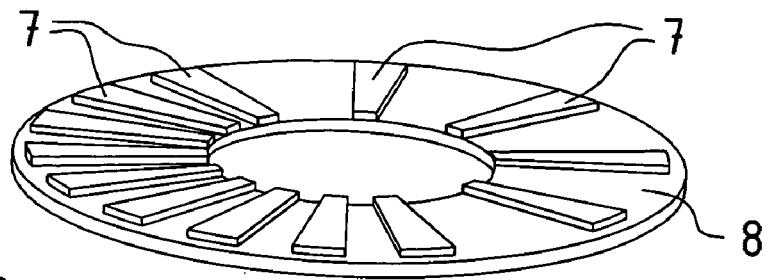
FIG. 10 is a bottom view of a circuit board according to a fourth embodiment of the motor.

It should be noted, according to a fourth embodiment, that by placing identical spokes 7 individually on the circuit board 8, it is particularly easy to form a circuit board as shown in FIG. 10, in which a magnetic field asymmetry is obtained by placing the spokes at smaller angular intervals in one half of the circuit board 8 than in the other.

Figure 12:
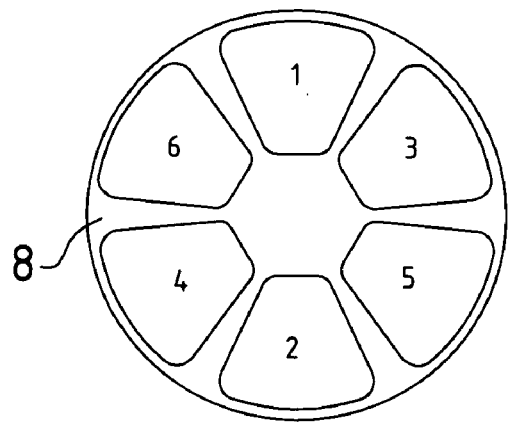
FIG. 12 is an electrical connection and placement scheme of coils 9a and 9b according to a fifth embodiment of the motor.
Figure 12:
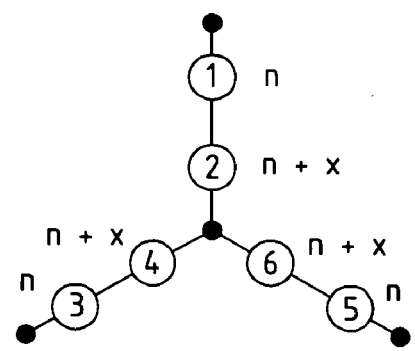

Another approach for obtaining a magnetic field asymmetry is illustrated in FIG. 12, showing an electrical connection scheme and placement scheme of coils 9a, coils 1, 3, 5 in FIG. 12 having n windings, and coils 9b, coils 2, 4, 6 in FIG. 12 having n+x windings, with different amounts of windings n, according to a fifth embodiment of the invention. The coils 5, 1, 3 in one half of the circuit board 8 have a smaller number of windings than the coils 4, 2, 6 of the other half, so that when the two groups of coils are supplied with identical currents, as shown in the connection scheme of FIG. 12, the magnetic attraction between the ring magnet and the coils 9a will be less than between the ring magnet and coils 9b.

The invention claimed is:

1. An electric motor comprising a stator having an air-gap which extends around an axis and in which a rotating magnetic field is generated, and a rotor comprising a shaft which is rotatably held by a bearing and a permanent magnet which is held in said air-gap and is driven to rotate around said axis by said rotating magnetic field, wherein the stator comprises a plurality of radially-oriented spokes made of soft magnetic material, and wherein in a first sector of said stator, at least one of the cross section of said spokes is different from that of said spokes in a second sector of said stator, to generate, in addition to said rotating magnetic field, a stationary magnetic field component which is rotationally asymmetric with respect to said axis.

2. The motor of claim 1, wherein in the first sector of the stator, at least one length of the spokes is different from that of the spokes in a the second sector.

3. The motor of claim 1, wherein in the first sector of the stator, the number of the spokes per unit angle is different from that in the second sector.

4. The motor of claim 1, wherein the spokes have their inward ends or their outward ends unitarily connected by a ring.

5. The motor of claim 1, wherein the spokes are embedded in or mounted on a non-conductive material.

6. The motor of claim 3, wherein the non-conductive material is a circuit board.

7. The motor of claim 1, wherein a shaft holding the permanent magnet has only one end supported in a bearing.

* * * * *